United States Patent
Yao

(10) Patent No.: US 9,826,210 B2
(45) Date of Patent: *Nov. 21, 2017

(54) IDENTIFYING GRAY REGIONS FOR AUTO WHITE BALANCING

(71) Applicant: Microsoft Technology Licensing, LLC, Redmond, WA (US)

(72) Inventor: Meng Yao, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/395,733

(22) Filed: Dec. 30, 2016

(65) Prior Publication Data

US 2017/0111625 A1  Apr. 20, 2017

Related U.S. Application Data

(63) Continuation of application No. 15/191,422, filed on Jun. 23, 2016, now Pat. No. 9,554,109, which is a continuation of application No. 14/309,779, filed on Jun. 19, 2014, now Pat. No. 9,424,628.

(51) Int. Cl.
*G06K 9/00* (2006.01)
*H04N 9/73* (2006.01)
*G06K 9/46* (2006.01)

(52) U.S. Cl.
CPC .......... *H04N 9/735* (2013.01); *G06K 9/4652* (2013.01); *G06K 9/4661* (2013.01); *G06K 2009/4657* (2013.01)

(58) Field of Classification Search
CPC .... H04N 9/735; H04N 1/6027; H04N 1/6086; H04N 1/6077; H04N 1/608; H04N 1/6088; H04N 1/60; H04N 5/2353; H04N 5/2355; G06T 11/001

See application file for complete search history.

(56) References Cited

U.S. PATENT DOCUMENTS

| | | | |
|---|---|---|---|
| 7,728,880 B2 | 6/2010 | Hung et al. | |
| 7,912,279 B2 | 3/2011 | Hsu et al. | |
| 8,064,110 B2 | 11/2011 | Noyes et al. | |
| 8,339,471 B2 | 12/2012 | Alcazar | |
| 9,424,628 B2 * | 8/2016 | Yao .......................... | G06T 5/00 |
| 9,554,109 B2 * | 1/2017 | Yao .......................... | G06T 5/00 |
| 2004/0120575 A1 | 6/2004 | Cheng | |
| 2006/0290957 A1 | 12/2006 | Kim et al. | |

(Continued)

OTHER PUBLICATIONS

Xiong, et al., "Automatic White Balancing via Gray Surface Identification", In Proceedings of the Fifteenth IS&T Color Imaging Conference, Nov. 2007, 4 pages.

(Continued)

*Primary Examiner* — Phuoc Tran

(57) ABSTRACT

Examples of the disclosure accurately define a gray region for automatic white balancing. Ratios corresponding to possible gray areas are white balanced before color distance metrics are calculated with respect to white points under different light sources. The color distance metrics of each point in the image data are compared with a predetermined threshold value to identify a gray region. Gray points within a captured image are identified using the gray region and input to any AWB method to accurately white balance the captured image.

20 Claims, 15 Drawing Sheets

(56) References Cited

U.S. PATENT DOCUMENTS

2007/0297011 A1  12/2007  Hung et al.
2008/0049274 A1   2/2008  Subbotin
2008/0101690 A1   5/2008  Hsu et al.
2010/0259639 A1  10/2010  Hung et al.
2010/0321521 A1  12/2010  Chang
2012/0262600 A1  10/2012  Velarde et al.
2013/0093916 A1   4/2013  Bai

OTHER PUBLICATIONS

"Non-Final Office Action Issued in U.S. Appl. No. 14/309,779", dated Nov. 23, 2015, 7 pages.
"Notice of Allowance Issued in U.S. Appl. No. 14/309,779", dated Mar. 11, 2016, 7 Pages.
"Notice of Allowance Issued in U.S. Appl. No. 15/191,422", dated Sep. 12, 2016, 8 Pages.

* cited by examiner

IDENTIFYING GRAY REGIONS FOR AUTO WHITE BALANCING

CROSS-REFERENCE TO RELATED APPLICATIONS

This application claims the benefit and is a continuation of U.S. application Ser. No. 15/191,422, entitled "IDENTIFYING GRAY REGIONS FOR AUTO WHITE BALANCING," which was filed on Jun. 23, 2016, which is a continuation of U.S. Pat. No. 9,424,628, entitled "IDENTIFYING GRAY REGIONS FOR AUTO WHITE BALANCING," which issued on Aug. 23, 2016, and are hereby incorporated by reference herein for all intents and purposes.

BACKGROUND

When pictures of the same object are captured under different light sources, red, green, and blue (RGB) signals produced by an image sensor are usually different. For example, the RGB signals captured for a gray object under daylight (e.g., around a color temperature of 6500K) may have a stronger blue signal than a red signal, while under horizon light (e.g., around a color temperature of 2200K) the red signal may be twice that of the blue signal. As a result, a gray object is captured differently as RGB signals generated by the same image sensor under different light sources are not likely to be equal to each other.

Various methods for automatic white balancing are known. Automatic white balancing techniques balance the RGB values of an image captured by an image sensor to generate equal RGB signals for a gray object under different light sources. However, a major difficulty in automatic white balancing techniques is identifying gray pixels. Previous methods, such as shown in FIG. 1, identify gray pixels using four lines to draw a quadrilateral in the B–G (blue minus green) versus R–G (red minus green) space as a region that encloses the white points for different light sources. However, with these methods, the quadrilateral needs to be large enough to enclose the different white points, and with a large enough quadrilateral, colors that are not close to any of the white points may also be erroneously enclosed within the quadrilateral. The result is that AWB algorithms are fooled by a dominant color in the scene because that color is included in the quadrilateral of white points, even though that color is not close to any of the white points.

SUMMARY

Examples of the disclosure accurately identify gray points in a captured image for use by an automatic white balance (AWB) algorithm, resulting in more accurate white balancing. Blue/green and red/green ratios that lie in any possible gray region are white-balanced (e.g., scaled) before a color distance metric is calculated with respect to a plurality of white points corresponding to different light sources. Based on a comparison of the color distance metrics to a threshold value, a gray region is defined. Subsequently, gray points in a captured image are identified using the defined gray region. The gray points are input to any AWB method to white balance the captured image.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Corresponding reference characters indicate corresponding parts throughout the drawings.

DETAILED DESCRIPTION

Referring to the figures, examples of the disclosure enable definition of an accurate gray region for accurate automatic white balancing of an image captured by an image capturing computing device 102 under different light sources. Ratios for a point in any possible gray region are white balanced using white balancing gains for all white points under consideration before calculating the color distance metric for each point. The color distance metrics of each point with respect to a plurality of white points (e.g., each corresponding to a different color temperature) are compared with a predetermined threshold value to define a gray region.

Subsequently, points in captured images are compared to the gray region to identify gray pixels. For example, aspects of the disclosure identify the region enclosing the white points accurately, and include only pixels close to the white points as potential gray pixels. These gray points or pixels are input to an automatic white balance (AWB) algorithm to accurately white balance the captured images.

Aspects of the disclosure are operable with any AWB algorithm to obtain improved results from that AWB algorithm. That is, the operations described herein may be incorporated in many previous AWB algorithms to improve the performance (e.g., accuracy) of the AWB algorithms. An AWB algorithm using the more accurate color distance metric as described herein provides more accurate definition of the gray region for identifying potential gray pixels, thus making the automatic white balancing more accurate. Some examples further describe a faster implementation for determining whether a color belongs to a gray region by defining the gray region using an upper and a lower boundary.

Further, while the examples described herein operate with respect to RGB sensors, other examples contemplate operation with reference to non-RGB sensors, such as CMY sensors, or RGBW sensors.

Figure 2:
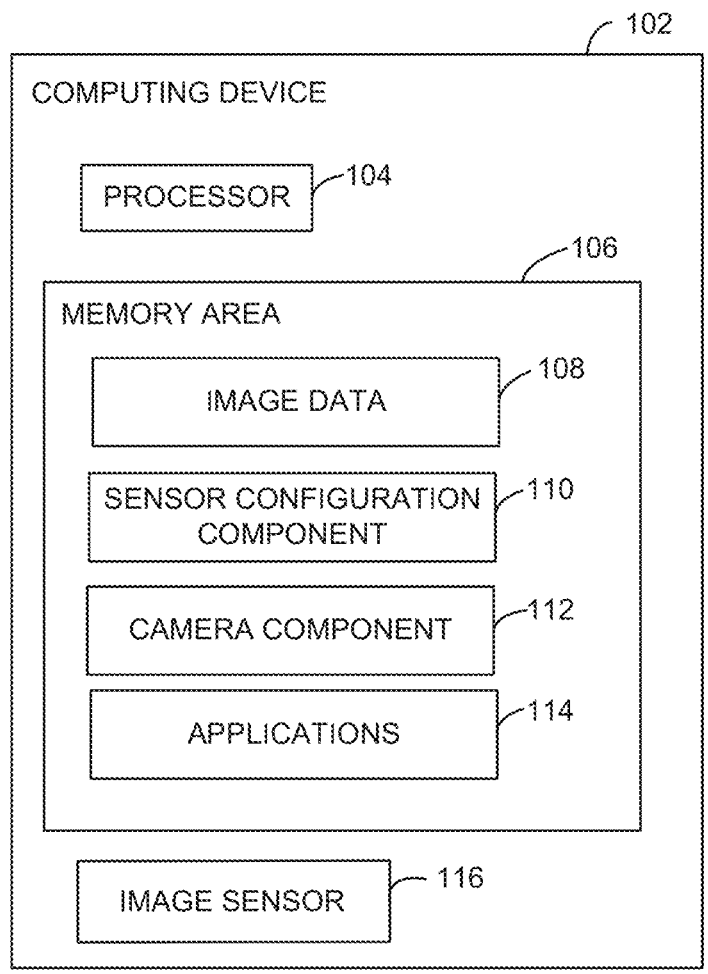
FIG. 2 is an exemplary block diagram illustrating a computing device with image capturing capabilities.

Referring to FIG. 2, an exemplary block diagram illustrates a computing device 102 for capturing images under different light sources. The computing device 102 represents any device executing instructions (e.g., as application programs, operating system functionality, or both) to implement the operations and functionality described herein. The computing device 102 may include a mobile computing device or any other portable device. In some examples, the computing device 102 includes a mobile telephone, laptop, digital camera, tablet, computing pad, netbook, gaming device, and/or portable media player. The computing device 102 may also include less portable devices such as desktop personal computers, kiosks, and tabletop devices. Additionally, the computing device 102 may represent a group of processing units or other computing devices. Each computing device 102 represented here include image capturing capabilities. In some examples, the raw data for white balancing may be obtained from another computing device.

In some examples, the computing device 102 has at least one processor 104. The processor 104 includes any quantity of processing units, and is programmed to execute computer-executable instructions for implementing aspects of the disclosure. The instructions may be performed by the processor 104 or by multiple processors executing within the computing device 102, or performed by a processor external to the computing device 102. In some examples, the processor 104 is programmed to execute instructions such as those illustrated in the figures (e.g., FIG. 3, FIG. 10, and FIG. 11).

In some examples, the processor 104 represents an implementation of analog techniques to perform the operations described herein. For example, the operations may be performed by an analog computing device and/or a digital computing device.

The computing device 102 includes one or more image sensors 116, such as a CMOS image sensor for generating the image data 108. The image sensors 116 employ solid state imaging components to convert light into electrical signals. The image sensors 116 detect the color of an object differently depending on the light source illuminating the object. In contrast, the human eye perceives objects as having a similar color, even under different light sources. That is, the human eye perceives gray as the same gray even under different light sources with different color temperatures, such as the sun, fluorescent lamps, and incandescent lamps. Most current digital image capturing devices adopt AWB algorithms for automatically adjusting white balance for rendering the color of the object, detected by the image sensor 116, similar to the color perceived by the human eye. Aspects of the disclosure improve the performance of those AWB algorithms.

In general, the image data 108 output by the image sensor 116 as a result of image capturing may be in the form of a periodic pattern in which each pixel is expressed as one of R, G, and B colors (i.e., red, green, and blue colors). In the present disclosure, "point" and "pixel" may be used interchangeably.

Figure 1:
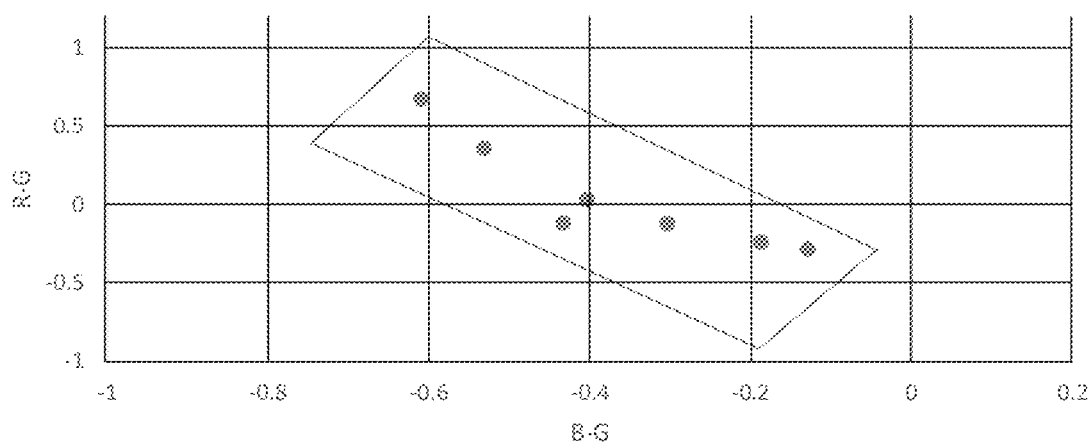
FIG. 1 is an exemplary known method for identifying gray points in an image.

The computing device 102 includes one or more computer readable media such as the memory area 106. The memory area 106 includes any quantity of media associated with or accessible by the computing device 102. The memory area 106 may be internal to the computing device 102 (as shown in FIG. 1), external to the computing device 102, or both. In some examples, the memory area 106 includes read-only memory and/or memory wired into an analog computing device.

The memory area 106 stores, among other data, one or more applications 114 and the image data 108. The applications 114, when executed by the processor 104, operate to perform functionality on the computing device 102. Exemplary applications 114 include mail application programs, web browsers, calendar application programs, address book application programs, messaging programs, media applications, location-based services, search programs, and the like. The applications 114 may communicate with counterpart applications or services such as web services accessible via a network. For example, the applications 114 may represent downloaded client-side applications that correspond to server-side services executing in the cloud.

The computing device 102 may communicate with another device via a network (e.g., to receive the image data 108). Exemplary networks include wired and wireless networks. Exemplary wireless networks include one or more of wireless fidelity (Wi-Fi) networks, BLUETOOTH brand networks, cellular networks, and satellite networks. In some examples, the other device is remote from the computing device 102. In other examples, the other device is local to the computing device 102.

The memory area 106 stores one or more computer-executable components to perform automatic white balancing for the captured image. Exemplary components include a sensor configuration component 110 and a camera component 112. In some examples, the sensor configuration component 110 executes at some time before the camera component 112 executes to capture and process images (e.g., in real-time). Further, the sensor configuration component 110 may execute at least once for each image sensor 116 in the computing device 102 (e.g., to define the gray region specific to each image sensor 116). The sensor configuration component 110 may also execute intermittently or periodically to accommodate variations in the image sensor 116 over time (e.g., due to changes in environmental conditions such as temperature, humidity, etc.).

The sensor configuration component 110, when executed, causes the processor 104 to define a gray region for a particular image sensor 116. R/G and B/G ratios covering possible gray points are selected. White-balancing gains are applied to the ratios. The sensor configuration component 110, when further executed, causes the processor 104 to calculate one or more color distance metrics for the white-balanced data with respect to white points corresponding to different light sources. The color distances are compared to a threshold value to define the gray region. The gray region is used to determine whether a particular pixel in a captured image is gray. In some examples, a sensor configuration component 110 includes computer-executable instructions (e.g., a driver) for operating the image sensor 116.

The sensor configuration component 110, while illustrated as being executed by the computing device 102, may be executed off the computing device 102 (e.g., executed by another entity or service). The results of executing the sensor configuration component 110, by another entity, may be provided to the computing device 102 (e.g., for use by the camera component 112).

The camera component 112, when executed, causes the processor 104 to determine, for a given gray region (e.g., defined by the sensor configuration component 110), whether each point in a captured image is within the gray region to identify all the points in the captured image that are gray. The points lying in the gray region are identified as gray points. The identified gray points are input to an AWB algorithm, wherein the AWB algorithm white balances the captured image.

White balancing allows the gray pixels to be represented by equal red green blue (RGB) values. For example, if the identified gray pixels have an average R/G and B/G ratio of 0.8 and 0.7 respectively, the red and blue gains will be 1.25 (1/0.8) and 1.429 (1/0.7) respectively, and the green gain is kept at 1. These gains are applied to the RGB values of every pixel in the image.

While some examples are described herein as being operable with an image sensor providing RGB values, aspects of the disclosure are operable with non-RGB sensors. For example, other forms of the image sensor 116 include RGBW sensors.

Figure 3:
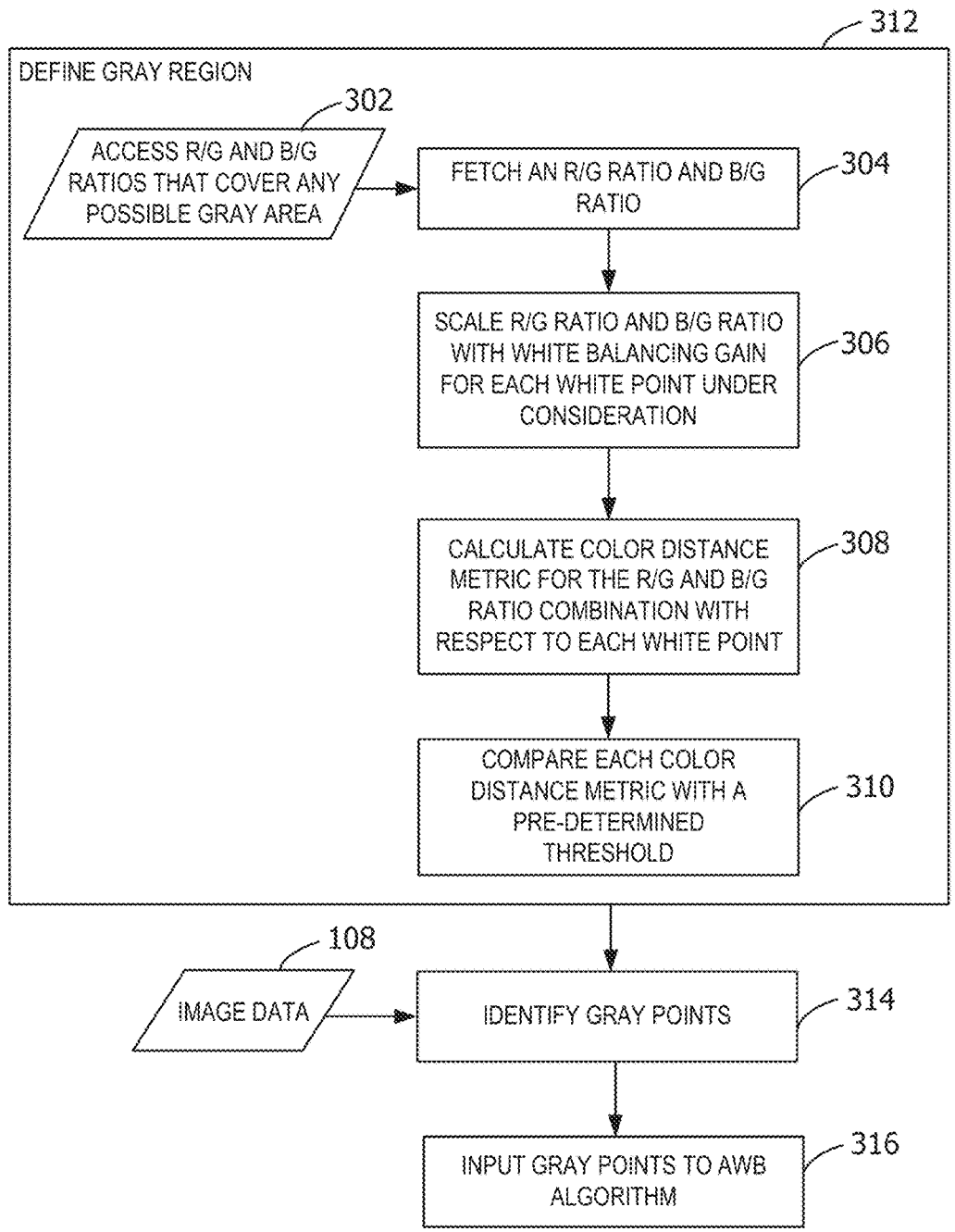
FIG. 3 is an exemplary flow chart illustrating operation of a computing device to identify gray points in an image and using the identified gray points to white balance the image.

Referring next to FIG. 3, an exemplary flow chart illustrates identification of the gray points in the captured image and white balancing of the image using the identified gray points. A computing device, such as computing device 102, performs the operations in 312 to define the gray region. The results of the operations illustrated in 312 are specific to each image sensor 116, and are performed at least once for each image sensor 116. In some examples, the operations illustrated in 312 are performed before the real-time white balancing of a particular captured image (e.g., operations 314 and 316).

Figure 4:
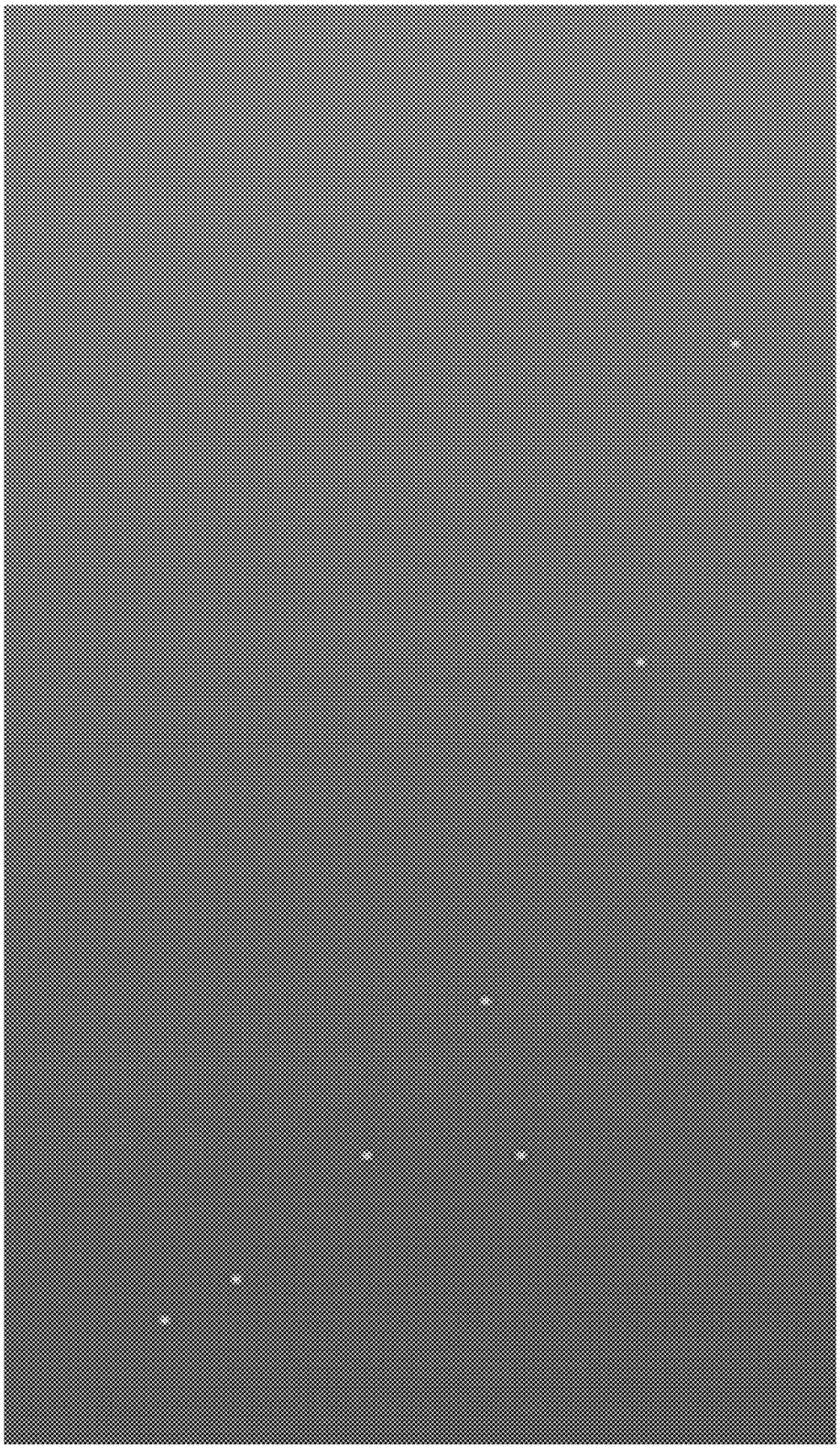
FIG. 4 illustrates an exemplary image showing white points for different light sources for an imaging sensor.

At 302, the computing device 102 accesses R/G and B/G ratios that cover any possible gray area. For example, the possible gray area represents the region of R/G and B/G ratios that covers any possible white points (e.g., such as the entire region in FIG. 5). At 304, the R/G ratio and B/G ratio of a point are fetched from this collection of ratios. FIG. 4 is an exemplary image map showing the range of R/G and B/G ratios that encloses any possible gray area, including several white points at different color temperatures for an exemplary image sensor 116: 7500K (top left), 6500K, 5000K, 4000K, 2800K, 2200K (bottom right), and a fluorescent light TL84 (isolated dot). White points at different color temperatures as seen by the image sensor 116 have different color tints, ranging from a blue tint at 7500K to an orange tint at 2200K.

In the present disclosure, R/G and B/G ratios are used to obtain the gray region enclosing the white points. In FIG. 4, R/G changes linearly along the horizontal axis, and B/G changes linearly along the vertical axis. White points are plotted in the image by measuring data of a few points and using curve fitting to identify the remaining white points. In an example, the R/G ratio (horizontal axis) has range from 0.6 to 2, and the B/G ratio (vertical axis) has range from 0.3 to 1, which more than covers the white points from 7500K to 2200K for the image sensor 116. The value of G is set to 0.4 (out of a maximum of 1.0). Each point in the image in FIG. 4 is represented by a combination of R/G and B/G ratios. The ranges for R/G and B/G vary by varying parameters of the image sensor 116.

At 306, the R/G ratio and B/G ratio are white balanced. For example, this combination of ratios for a point may be white balanced by scaling the R/G ratio and B/G ratio of the point using white balancing gains for one or more white points under consideration. The set of white points may be interpolated to form a curve (e.g., see the black body line in FIG. 5 and FIG. 6). For example, a point X on the image map has R/G, B/G ratios of (Ratio_RG0, Ratio_BG0) and its distance to the white point of 7500K, which has R/G, B/G ratios of (Ratio_RG_7500K, Ratio_BG_7500K), is calculated by first white balancing the point X using the 7500K white balancing gains. The white balancing gains for the white point of 7500K are shown in Equations (1) and (2) below.

$$GainR\_7500K = 1/Ratio\_RG\_7500K \quad (1)$$

$$GainB\_7500K = 1/Ratio\_BG\_7500K \quad (2)$$

Applying white balancing gains to the point X results in new R/G, B/G ratios for the point X. The new R/G and B/G ratios for the point X are given by Equations (3) and (4) below.

$$Ratio\_RG1 = Ratio\_RG0 * GainR\_7500K \quad (3)$$

$$Ratio\_BG1 = Ratio\_BG0 * GainB\_7500K \quad (4)$$

The point X may be similarly white balanced using the white balancing gains of one or more of the other white points (e.g., along the black body line). At 308, a color distance metric is calculated for the white-balanced point (e.g., represented by the now-scaled R/G and B/G ratios) with respect to each white point. The color distance metric represents a distance of the white-balanced point in the image map to one of the white points. The color distance metric D of the point X to the 7500K white point is calculated using Equation (5) below.

$$D^2 = (Ratio\_RG1 - 1)^2 + (Ratio\_BG1 - 1)^2 \quad (5)$$

Figure 5:
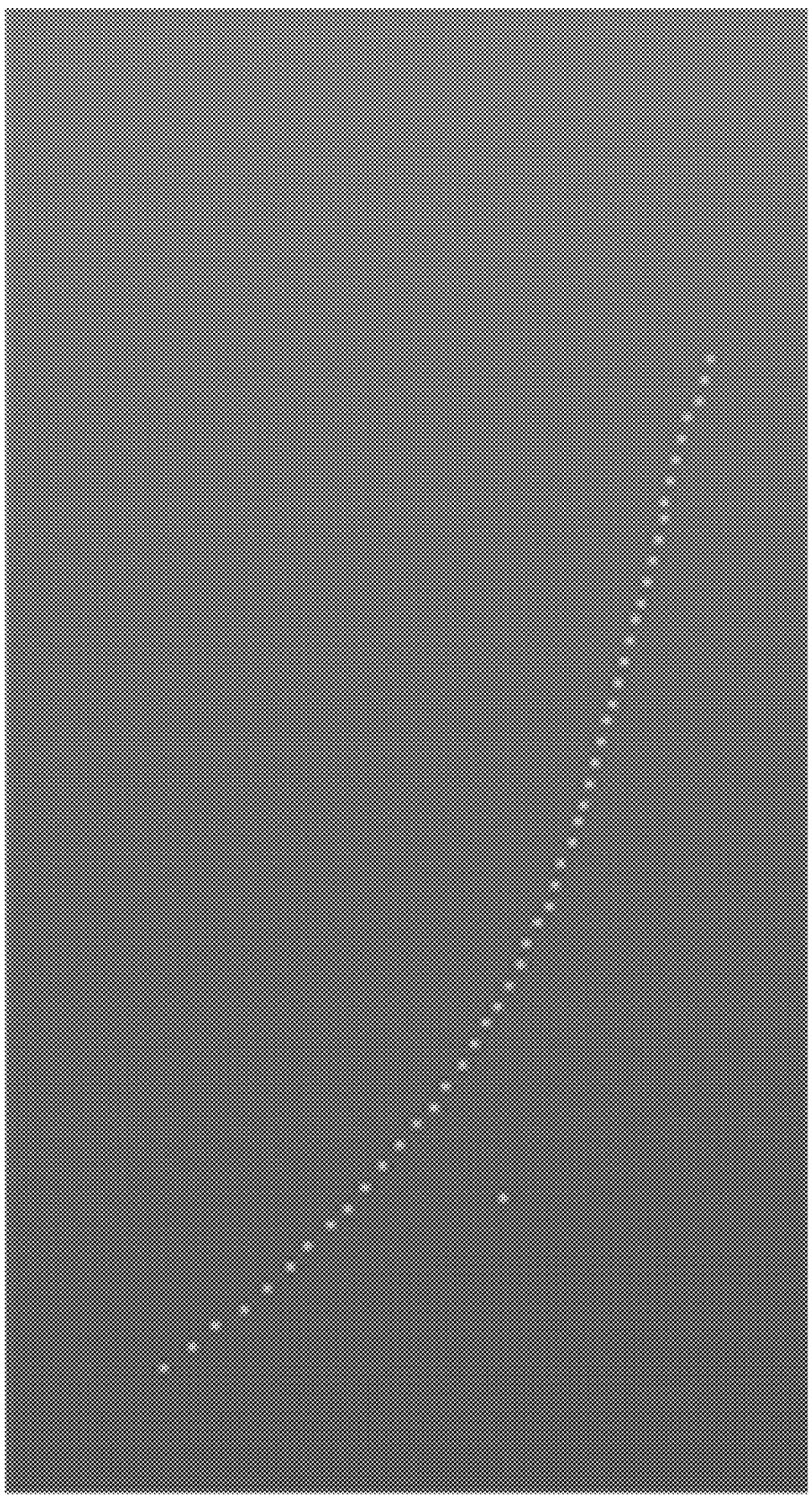
FIG. 5 illustrates an exemplary image derived from FIG. 4 by using curve fitting to obtain the black body trajectory.

In this example, $D^2$ is used instead of D to avoid the calculation of the square root (e.g., reduce complexity, increase processing speed). After the white balancing, the 7500K white point itself has R/G and B/G ratios of 1, which is used for calculating the color distance metric. This color distance metric D is the distance from the point X to the 7500 white point after white balancing has been applied. The distances from this point to all the white points in FIG. 5 are calculated in the similar way as described above by again applying white balancing gains for each white point to that point before obtaining the distance. All the distances are arranged in ascending order and the shortest distance among the calculated distances corresponds to the distance from that point to the closest white point.

At 310, after calculating the color distance metric, each color distance metric is compared with a pre-determined threshold. The gray region is defined based on the comparison. For example, the gray region is defined by obtaining the color distance metric for each point in the image map (e.g., FIG. 5), and finding the distance of that point to the closest white point using the above approach. If this distance (e.g., the minimum distance among the calculated distances) for a point is less than the pre-determined threshold, then that point is considered to be in the gray region. That is, that point defined by a pair of R/G and B/G ratios is considered a gray point based on the corresponding white point. This process is performed for a plurality of R/G and B/G ratios, in some examples, to define the gray region.

Figure 6:
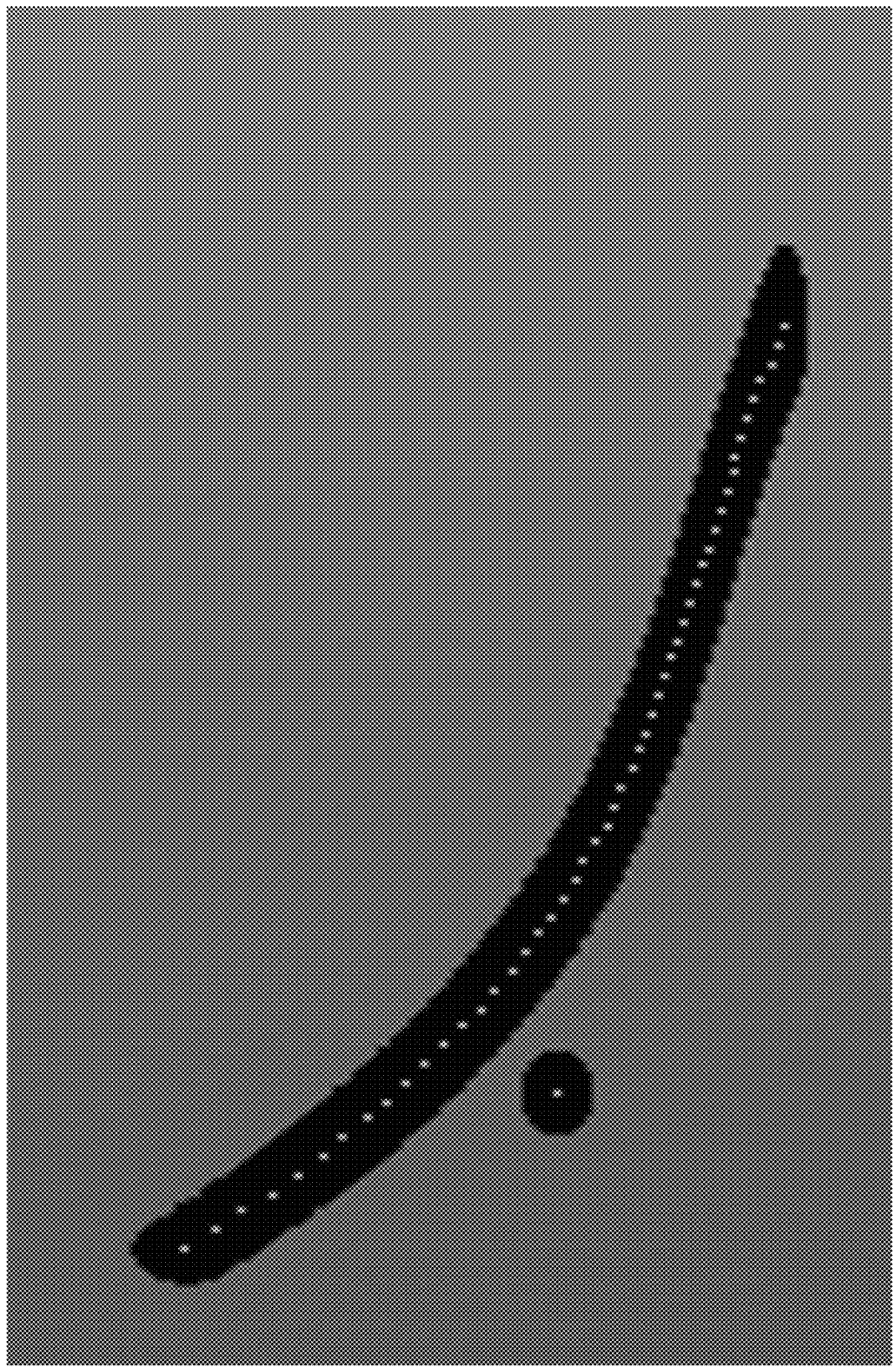
FIG. 6 illustrates an exemplary image showing a gray region for the white points.
Figure 7:
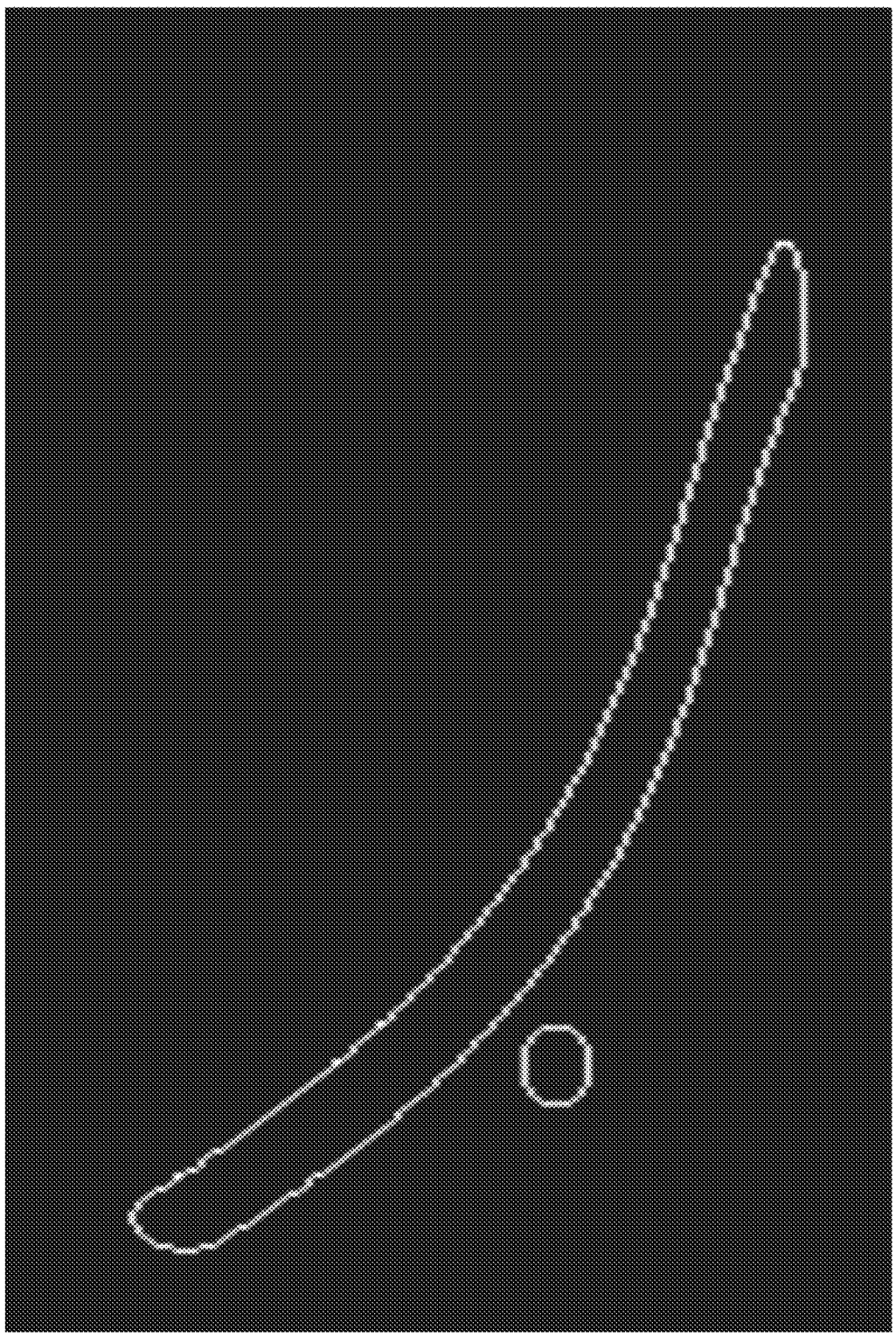
FIG. 7 illustrates an exemplary image showing the boundary of the gray region using white contours.

In an example, FIG. 6 illustrates the gray region, shown in black, with a predefined threshold of 0.05 for the distance D. The gray region contains all the R/G and B/G ratios that are within a pre-determined threshold distance (after white balancing) from the closest white point. FIG. 7 shows the boundary of the gray region using white contours.

Figure 8:
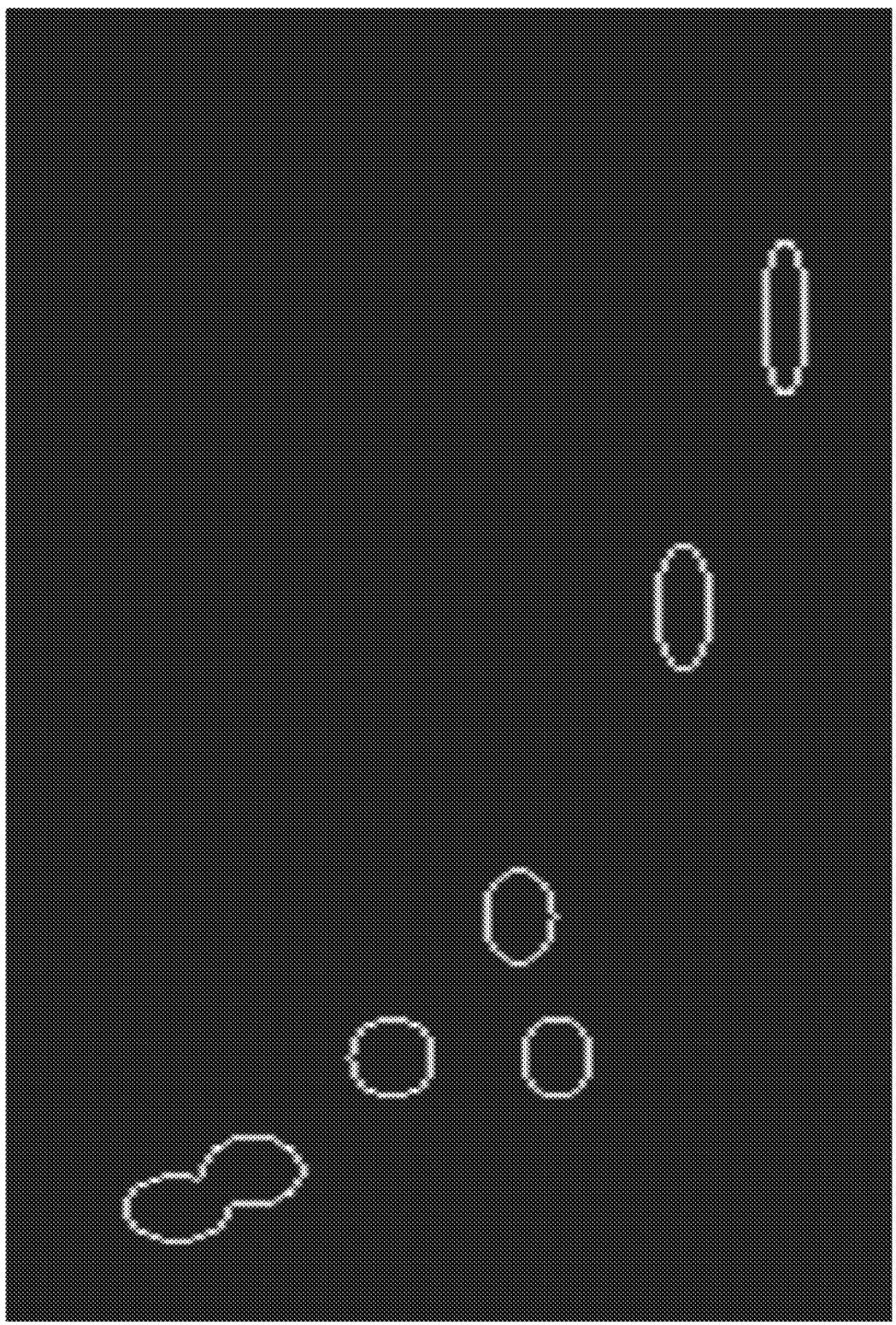
FIG. 8 illustrates the contours enclosing the white points from FIG. 4 within a pre-determined threshold distance to the white points.

Referring next to FIG. 8, the contours enclosing the points in FIG. 4 are within a pre-determined threshold distance to the white points. For example, execution of operations 302, 304, 306, 308, 310 (part of 312) in FIG. 3 results in the gray region having a substantially elliptical form with the major axis along the B/G ratio (vertical axis) and the minor axis along the R/G ratio (horizontal axis) at 7500K. At 2200K, the gray region has a substantially elliptical form with the major axis along the R/G ratio (horizontal axis) and the minor axis along the B/G ratio (vertical axis). This is because at 7500K, white balancing requires that the red gain be larger than the blue gain. The distance along the R/G axis after white balancing is magnified more than the distance along the B/G axis. Because the contours show locations of points on the image map before white balancing, the ellipse for the 7500K white has its minor axis along the R/G ratio to compensate for a larger red gain. The opposite is true for 2200K, where the B/G gain is much higher than the R/G gain for white balancing resulting in an even more skewed ellipse. At 7500K, more blue color is included in the region of gray points. At 2200K, much more red color is included in the region of gray points due to the extreme ellipse.

The points with equal distance to a white point form an ellipse in the R/G, B/G space. The color distance metric may be represented as shown in Equations (6) and (7) below, using a 7500K white point as an example, $$D^2 = (\text{Ratio}\_RG0/\text{Ratio}\_RG\_7500K-1)^2 + (\text{Ratio}\_BG0/\text{Ratio}\_BG\_7500K-1)^2 \quad (6)$$

$$D^2 = ((\text{Ratio}\_RG0-\text{Ratio}\_RG\_7500K)/\text{Ratio}\_RG\_7500K)^2 + (\text{Ratio}\_BG0-\text{Ratio}\_BG\_7500K)/\text{Ratio}\_BG\_7500K)^2 \quad (7)$$

The color distance metric for the 7500K white point represents an ellipse centered at the 7500K white point with Ratio_RG_7500K (denominator of first term) and Ratio_BG_7500K (denominator of second term) defining the two axes of the ellipse.

In an example, the black body line includes White Points 1, 2, and 3. The location of an Image Point 0 is specified by a pair of R/G, B/G ratios. To find the distance from Image Point 0 to White Point 1, the R/G, B/G ratios are scaled by the white balance gains for White Point 1. Similarly the distance is calculated between Image Point 0 and White Point 2 (e.g., using white point gains for White Point 2), and Image Point 0 and White Point 3 (e.g., using white point gains for White Point 3). If any of the three distances, which are scaled by white balancing gains for the respective white points, is less than the pre-determined threshold, then Image Point 0 is in the gray region. As another example, if there are 30 white points on the black body line, then 30 distances are calculated for Image Point 0, with respective white point gains being applied before calculating distances. If any of the 30 calculated distances are less than the threshold, Image Point 0 is in the gray region.

An exemplary implementation of the operations in 312 is described with reference to FIG. 10 below.

Subsequently, after defining the gray region for the image sensor 116, the computing device 102 processes the image data 108 captured by the computing device 102 (or captured by another device). At 314, the image data 108 is accessed to identify the gray points. A gray pixel condition is defined to identify the gray points. Each pixel in the image is checked to determine whether the pixel passes the gray pixel condition. If the pixel is within the defined gray region, the pixel is considered a gray point. The computing device 102 provides the identified gray points as input to any AWB algorithm at 316. An exemplary implementation of the operations 314 and 316 is described with reference to FIG. 11 below.

Figure 9:
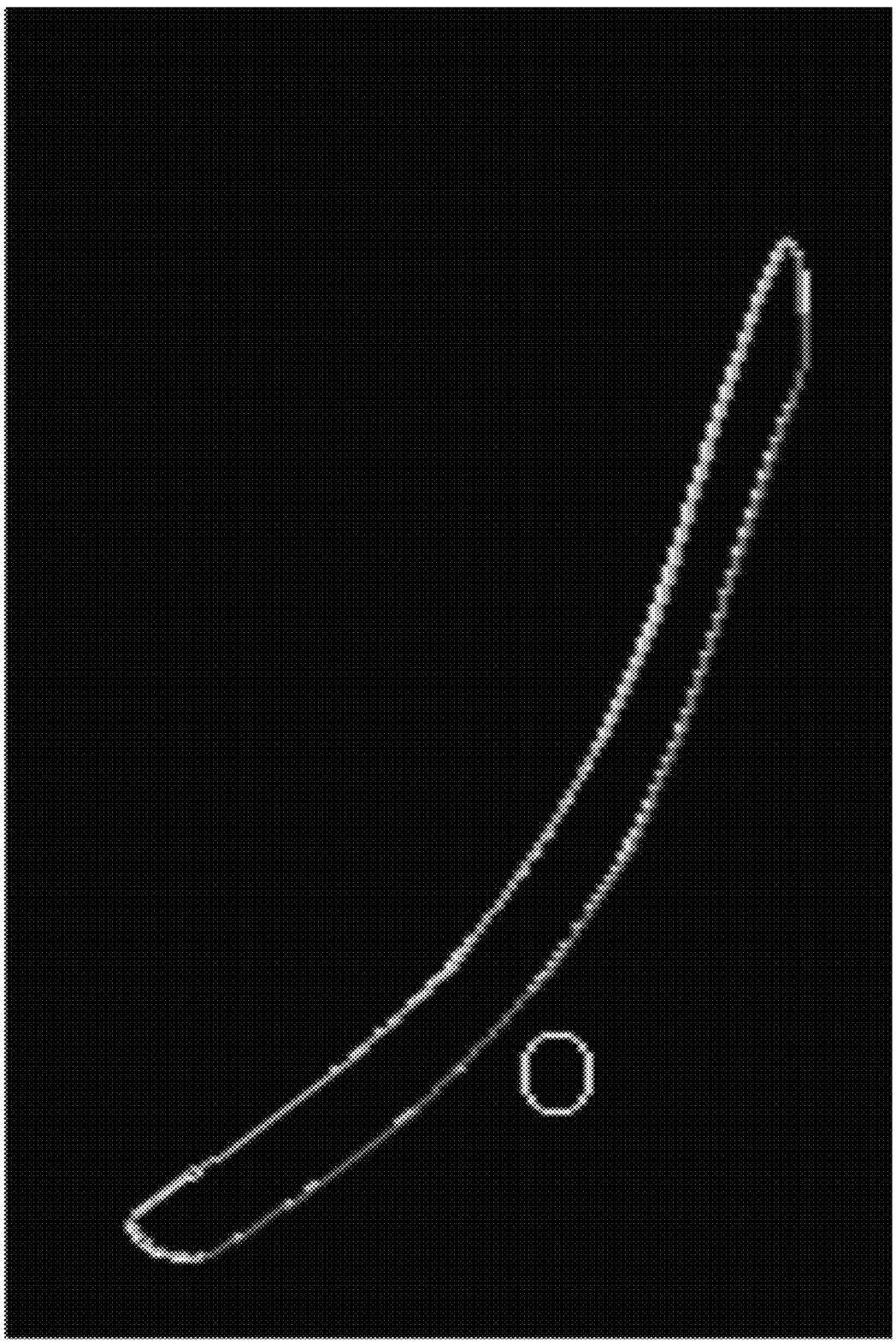
FIG. 9 illustrates a boundary of the gray region for white points on the black body trajectory shown in FIG. 6 by a plurality of line segments.

FIG. 9 illustrates the boundary of the gray region for white points on the trajectory in FIG. 6 by a plurality of line segments. The line segments are put in two groups, one group representing a lower boundary and another group representing an upper boundary. For each pixel in the image, its R/G ratio is used to determine which line segment contains this R/G ratio for the lower boundary and the upper boundary respectively. Linear interpolation is used to calculate the B/G ratio on the lower boundary as well as the B/G ratio on the upper boundary using the corresponding line segments. If the B/G ratio of the pixel falls between the lower and upper boundary, this pixel is in the gray pixel region enclosed by the red and green line segments and passes the gray pixel condition (e.g., the pixel is considered gray). For isolated white points (e.g., white points not on the black body line, such as fluorescent lights) the distance is calculated between each pixel and an isolated white point after white balance has been performed using gains for that isolated white point. If the calculated distance is less than the pre-determined threshold, the pixel is considered to be in the gray region. Aspects of the disclosure output a white point trajectory (e.g., a black body line), isolated white points (e.g., fluorescent lights), or both. This approach enables the output of the disclosure to be input to different AWB algorithms requiring different inputs.

The method of determining a gray region using line segments for an upper and lower boundary as described herein may also be applied to the quadrilateral of the prior art (as shown in FIG. 1). The two lower line segments of the quadrilateral define the lower boundary and the two upper line segments of the quadrilateral define the upper boundary of a gray region. Whether or not a color falls in the gray region defined by the quadrilateral may be determined using the approach illustrated in FIG. 3.

Another way to determine the gray region is to use curve fitting for the upper and lower boundaries. The upper boundary may be curve fitted with one polynomial, for example, and the lower boundary may be curve fitted with another polynomial (e.g., the two polynomials define the range for the B/G ratio as a function of the R/G ratio), and the R/G ratio may be set to a range. The upper and lower polynomials together with the R/G range define the gray region. When determining whether a color falls in the gray region, the R/G and B/G ratios are first calculated. Then, its R/G ratio is used to determine the B/G ratio on the upper and lower polynomials respectively. The B/G ratio of the color has to fall between the B/G ratios on the upper and lower polynomials for the color to be in the gray region.

For reasons of robustness, in addition to the gray pixel condition, aspects of the disclosure exclude pixels that are too dark or too light. The luma of the pixel may be calculated as shown in Equation (8) below.

$$\text{luma} = 0.21*R + 0.72*G + 0.07*B \tag{8}$$

If the luma is within a range, such as between 0.1 and 0.9, the pixel is considered when calculating AWB gains. For all the pixels that pass the gray pixel condition and the luma condition, their R/G and B/G ratios are averaged respectively to obtain Ratio_RG_AWB and Ratio_BG_AWB. White balancing gains are then obtained as shown in Equations (9) and (10) below.

$$\text{Gain}R = 1/\text{Ratio\_RG\_AWB} \tag{9}$$

$$\text{Gain}B = 1/\text{Ratio\_BG\_AWB} \tag{10}$$

The white balancing gains may be applied to the entire image to white balance the image.

Examples of the present disclosure allow the threshold to be biased by weighting the color distance metric towards one of the R/G and B/G ratios. Weighting the color distance metric includes, for example, modifying the color distance metric using the weighting coefficients as given in Equation (11) below.

$$D^2 = C1*(\text{Ratio\_RG1} - 1)^2 + C2*(\text{Ratio\_BG1} - 1)^2 \tag{11}$$

For example, when the weighting coefficient C1 is 0.9 and C2 is 1, there will be a larger range of R/G ratios meeting the gray pixel condition. In some examples, the modified color distance metric is calculated as a function of color temperature.

Figure 10:
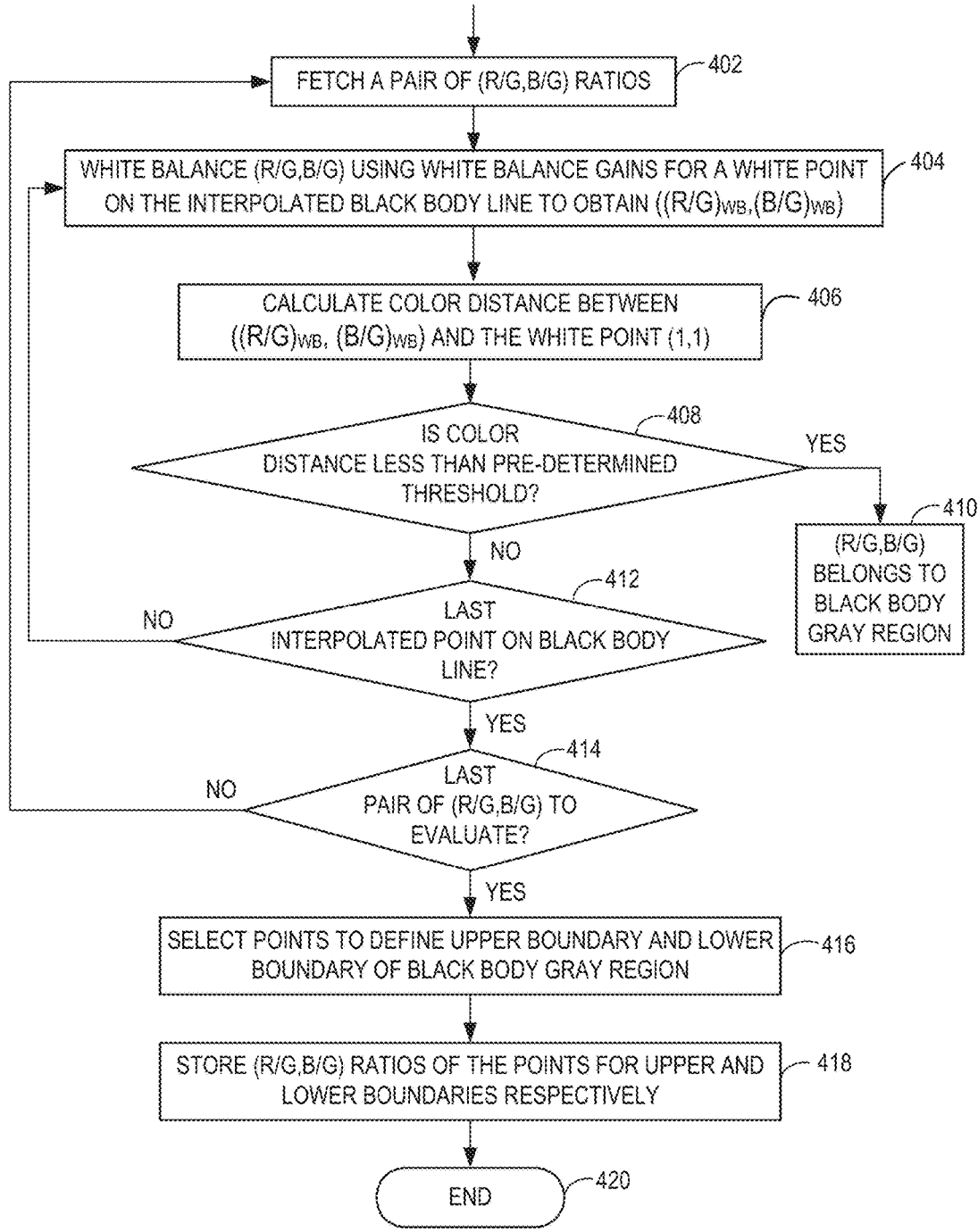
FIG. 10 is an exemplary flowchart showing a method for defining a gray region.

Referring next to FIG. 10, an exemplary flowchart illustrates a method for defining the gray region around the black body line according to an example of the present disclosure. At 402, a pair of R/G and B/G ratios corresponding to a point in any possible gray region is calculated or fetched from the memory area 106. At 404, the R/G and B/G ratios for the point are white balanced using white balancing gains for a white point on an interpolated black body line to obtain $(R/G)_{WB}$ and $(B/G)_{WB}$.

At 406, a color distance metric is calculated between the point with $(R/G)_{WB}$ and $(B/G)_{WB}$ and the white point. At 408, the color distance metric is compared with a predefined threshold value. If the color distance metric is less than the predefined threshold, the computing device 102 concludes at 410 that the point (R/G, B/G) belongs to the black body gray region.

At 412, the computing device 102 determines whether the point is the last interpolated point on the black body line. If the point is not the last interpolated point, then the point is white balanced with respect to the next white point. For example, white point 2 on the interpolated black body line is used to obtain $(R/G)_{WB}$ and $(B/G)_{WB}$ with respect to white point 2. Similarly, as described above, the color distance metric of the point with respect to the white point 2 is calculated which is then compared with the predetermined threshold value to identify whether the point belongs to the black body gray region. This process is repeated for the point with respect to each white point on the interpolated black body line.

At 414, the computing device 102 determines whether the point with the pair of R/G and B/G ratios is the last point in any possible gray region. The operation at 414 is performed when the computing device 102 determines at operation 412 that the white point is the last white point on the interpolated black body line. Operation 414 is performed after checking each pair of R/G and B/G ratios with respect to all the white points on the interpolated black body line. When the computing device 102 determines that the point with the R/G and B/G ratios is not the last point in any possible gray region, the process is repeated from operation 402. R/G and B/G ratios of the next point in any possible gray region are accessed and operations 402 to 414 are repeated until the point is the last pair of R/G and B/G ratios in any possible gray region.

When the computing device 102 determines that the point with the R/G and B/G ratios is the last point in any possible gray region, then the points satisfying the conditions as described herein are selected at 416 to define the lower and upper boundaries of the black body region. At 418, the R/G and B/G ratios of the points falling in the upper and lower boundaries are stored in the memory area 106. At 420, the process for defining the black body region ends.

Figure 11:
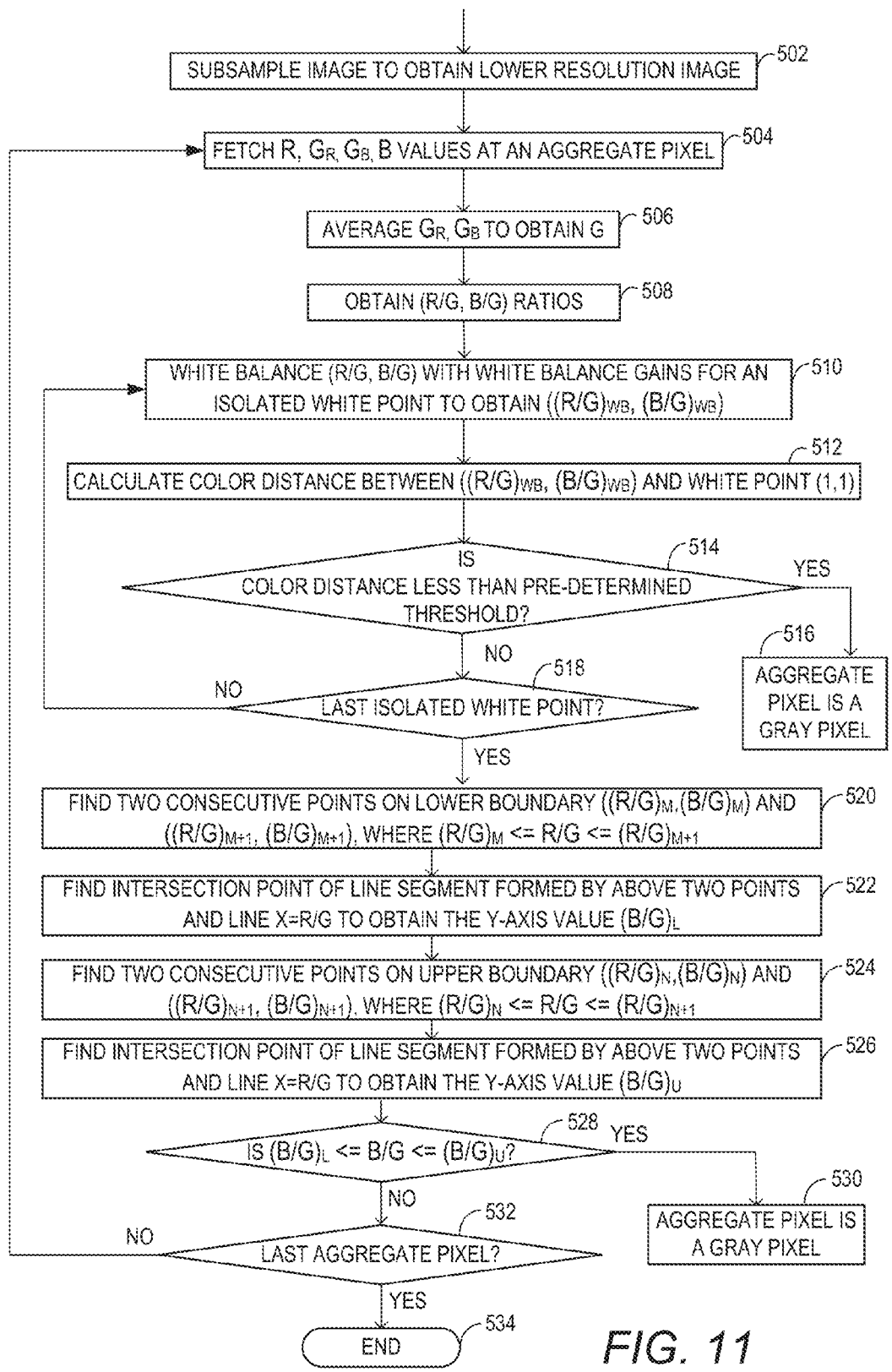
FIG. 11 is an exemplary flowchart showing a method for identifying gray pixels in the captured image.

Referring next to FIG. 11, an exemplary flowchart illustrates a method for identifying gray pixels in the captured image. At 502, the captured image is subsampled into a lower resolution image. The subsampling may be performed by any known downsampling method. At 504, R, GR, GB, B values at an aggregate pixel in the image is fetched. Because color filters are used in the image sensor 116, R, G and B colors may not all be available at a pixel location. An aggregate pixel represents a group of pixels containing each of the different colors, such as R, GR, GB, and B.

At 506, GR and GB are averaged to obtain the value of G. At 508, R, B, and G values are used to obtain values for the R/G and B/G ratios for the aggregate pixel. An isolated white point is selected at 510 to white balance the aggregate pixel using the white balance gains associated with the white point. The R/G and B/G ratios of the aggregate pixel are white balanced using the white balance gains associated with the white point to obtain the $(R/G)_{WB}$ and $(B/G)_{WB}$ ratios for the aggregate pixel. After white balancing the aggregate pixel, a color distance metric associated with the aggregate pixel is calculated with respect to the white point at 512.

At 514, the color distance metric is compared with a pre-determined threshold value. If the color distance metric is less than or equal to the pre-determined threshold value, the aggregate pixel is identified as a gray pixel at 516. If the color distance metric is more than the pre-determined threshold value, then the computing device 102 determines at 518 whether the isolated white point is the last of the isolated white points under consideration. If not, then the aggregate pixel is white balanced with respect to the next white point (e.g., white point 2) to obtain $(R/G)_{WB}$ and $(B/G)_{WB}$ with respect to that next white point (e.g., white point 2). Similarly as described above, the color distance metric of the aggregate pixel with respect to the white point 2 is calculated which is then compared with the predetermined threshold value to identify whether the aggregate pixel is a gray pixel. This process is repeated for the aggregate pixel with respect to each isolated white point.

When the computing device 102 determines that the white point is the last isolated white point, then the lower and upper boundaries of the gray region defined at 416 in FIG. 10 are used to determine whether the aggregate pixel is a gray pixel along the black body line. At 520, two consecutive points on the lower boundary $((R/G)_M, (B/G)_M)$ and $((R/G)_{M+1}, (B/G)_{M+1})$ are found such that the R/G ratio of point M is less than or equal to the R/G ratio of the aggregate pixel, and the R/G ratio of point M+1 is greater than or equal to the R/G ratio of the aggregate pixel (e.g., $(R/G)_M \leq R/G \leq (R/G)_{M+1}$).

At 522, an intersection point of a line segment formed by the above two points (M and M+1) and a line X=R/G is found to obtain a y-axis value $(B/G)_L$. At 524, two consecutive points on the upper boundary $((R/G)_N, (B/G)_N)$ and $((R/G)_{N+1}, (B/G)_{N+1})$ are found such that the R/G ratio of point N is less than R/G ratio of the aggregate pixel, and the R/G ratio of point N+1 is greater than the R/G ratio of the aggregate pixel (e.g., $(R/G)_N <= R/G <= (R/G)_{N+1}$). At 526, an intersection point of the line segment formed by the above two points (N and N+1) on the upper boundary and line X=R/G is found to obtain the y-axis value $(B/G)_U$.

At 528, the B/G ratio of the aggregate pixel is compared with $(B/G)_L$ and $(B/G)_U$. If the B/G ratio of the aggregate pixel is greater than or equal to $(B/G)_L$ and less than or equal to $(B/G)_U$ (e.g., the aggregate pixel satisfies a condition $(B/G)_L <= B/G <= (B/G)_U$), the aggregate pixel is determined to be a gray pixel at 530. If the aggregate pixel does not satisfy the above condition, then the computing device 102 determines at 532 whether the aggregate pixel is the last aggregate pixel in the captured image. If the computing device 102 determines that the aggregate pixel is not the last aggregate pixel, then the R, GR, GB, B values at the next aggregate pixel are fetched (as in operation 504). Operations 504 to 532 are repeated until there are no more aggregate pixels in the accessed image. At 534, when the computing device 102 determines that the aggregate pixel is the last aggregate pixel to process, the process ends.

Figure 12:
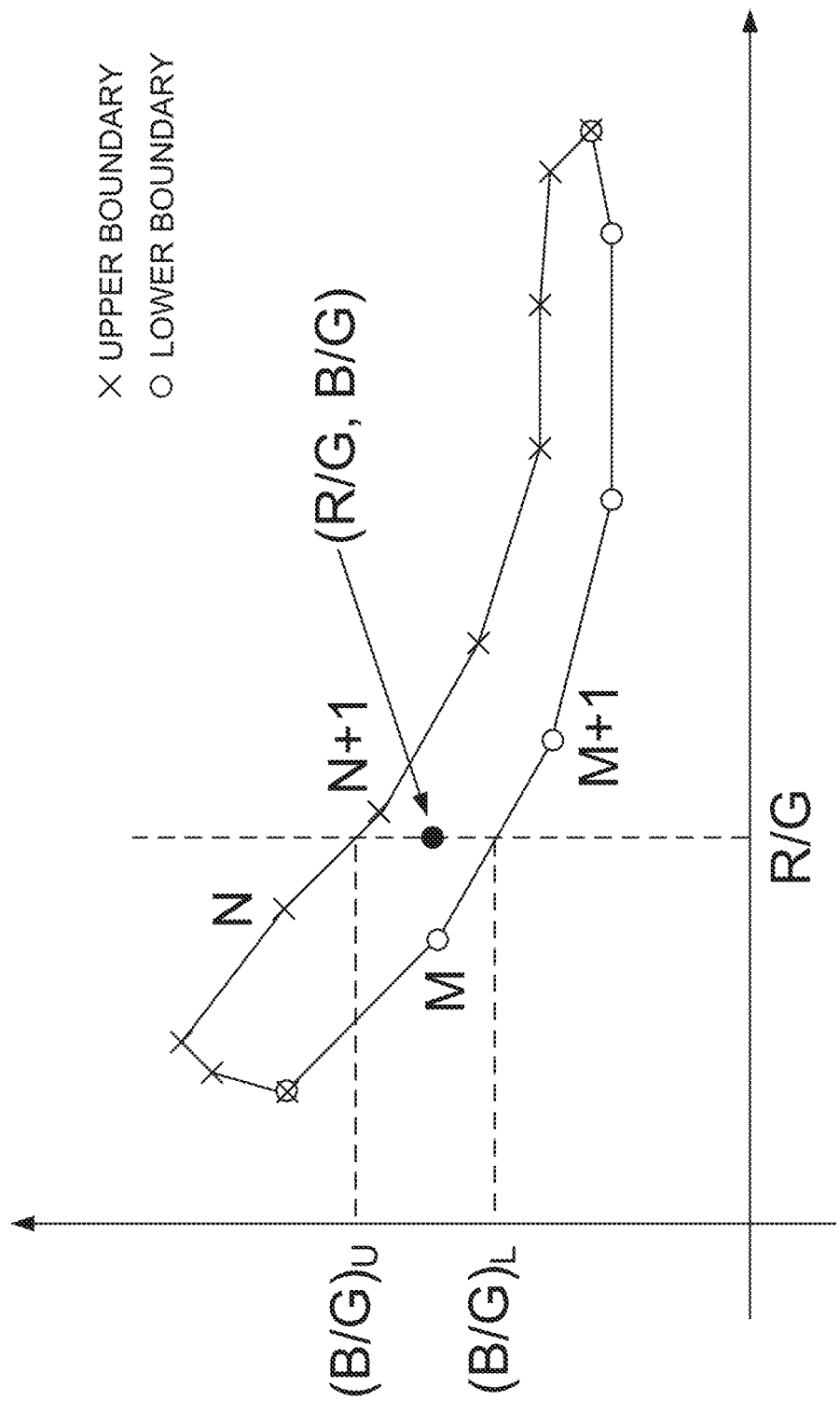
FIG. 12 illustrates identifying a gray pixel in an image.

FIG. 12 illustrates identifying a gray pixel in an image. Given a pixel with ratios of R/G and B/G, R/G is contained in a line segment formed by M and M+1 on the lower boundary, and contained in a line segment formed by N and N+1 on the upper boundary. If $(B/G)_L <= (B/G) <= (B/G)_U$, then point (R/G, B/G) is in the gray region; otherwise, the point (R/G, B/G) is not in the gray region.

In an example, the color distance metric is based on R−G and B−G values instead of R/G and B/G values. However, the R−G and B−G values are white balanced before calculating the color distance metric, similar to the R/G and B/G values.

Additional Examples

Figure 13:
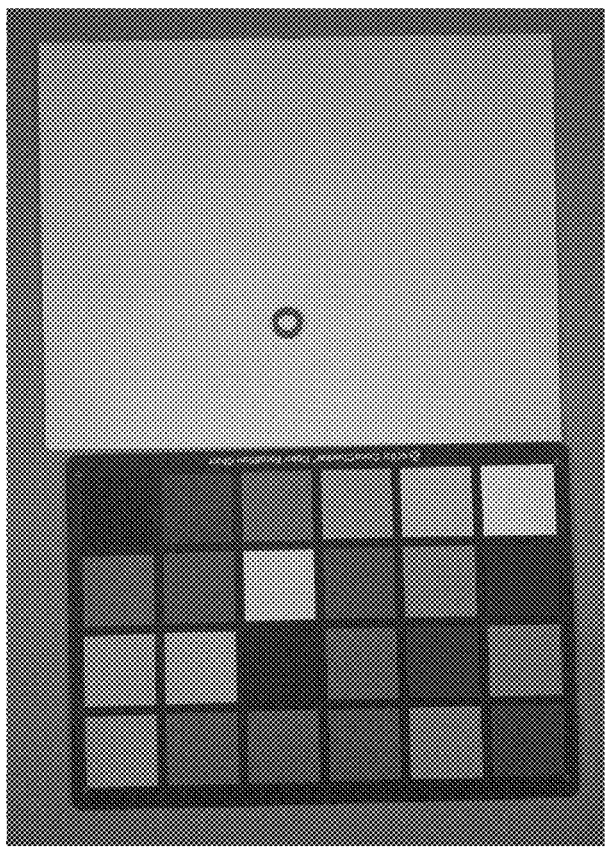
FIG. 13 shows exemplary images for comparison of a previous automatic white balancing method by a computing device (left), and automatic white balancing by a computing device using the present disclosure (right) with a yellow folder in the scene (6500K).
Figure 13:

In an example, automatic white balancing using the present disclosure is compared against some other AWB methods. FIG. 13 shows a comparison of automatic white balancing by a computing device using previous methods (left), and automatic white balancing by a computing device using the present disclosure (right). The images in the example are taken under a light source with a color temperature of 6500K. In the left image, the gray background and the gray patches displayed by a color checker (e.g., the Macbeth Color Checker) have turned blue because of the dominant yellow color folder in the scene. The left image shows the failure of the other AWB methods due to the dominant color of the yellow folder. Note that the yellow folder itself does not look yellow after white balancing using the previous AWB methods. In contrast, the right image shows that the automatic white-balanced image using the present disclosure is not affected by the yellow folder, and produces better results.

Figure 14:
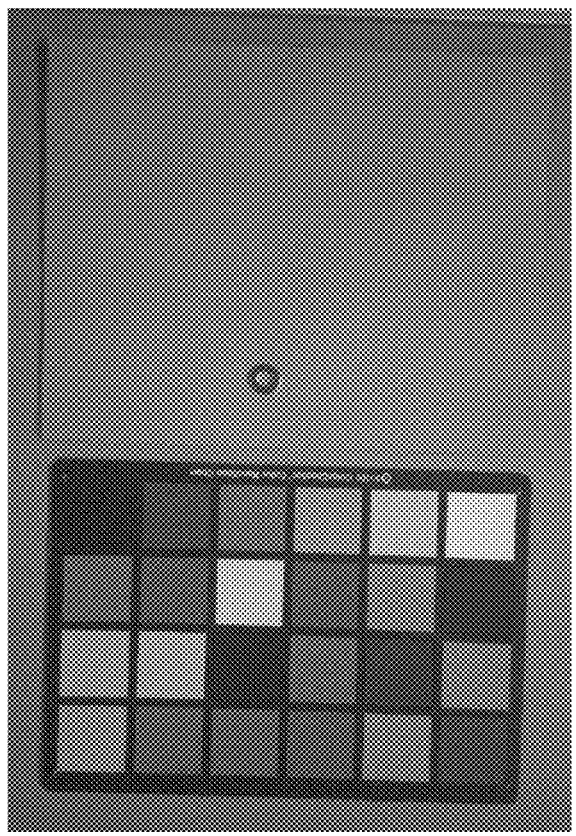
FIG. 14 shows exemplary images for comparison of a previous automatic white balancing method by a computing device (left), and automatic white balancing by a computing device using the present disclosure (right) with an orange folder in the scene (6500K).
Figure 14:
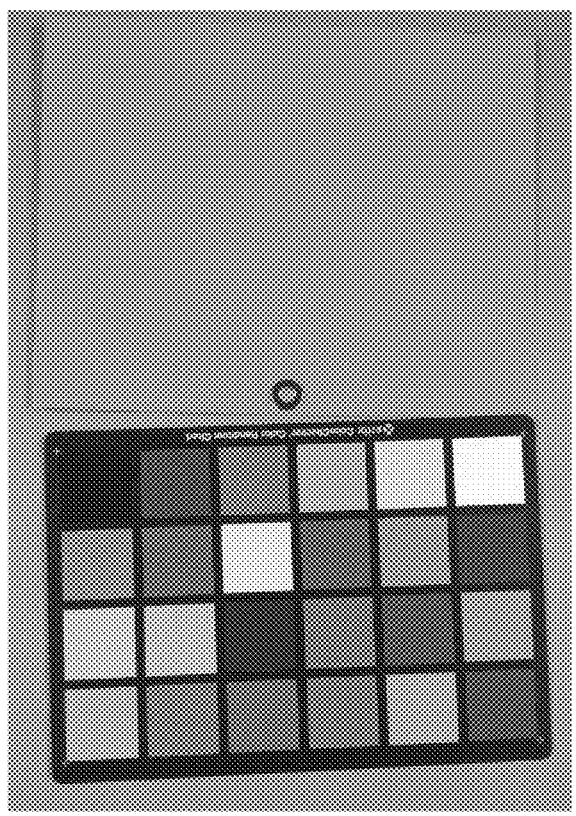

In another example, FIG. 14 shows a comparison of automatic white balancing by a computing device using previous methods (left), and automatic white balancing by a computing device using the present disclosure (right) with an orange folder in the scene (6500K). The gray background and gray patches in the color checker have turned blue due to the orange folder, but the image using the present disclosure is not affected by the orange folder.

Figure 15:
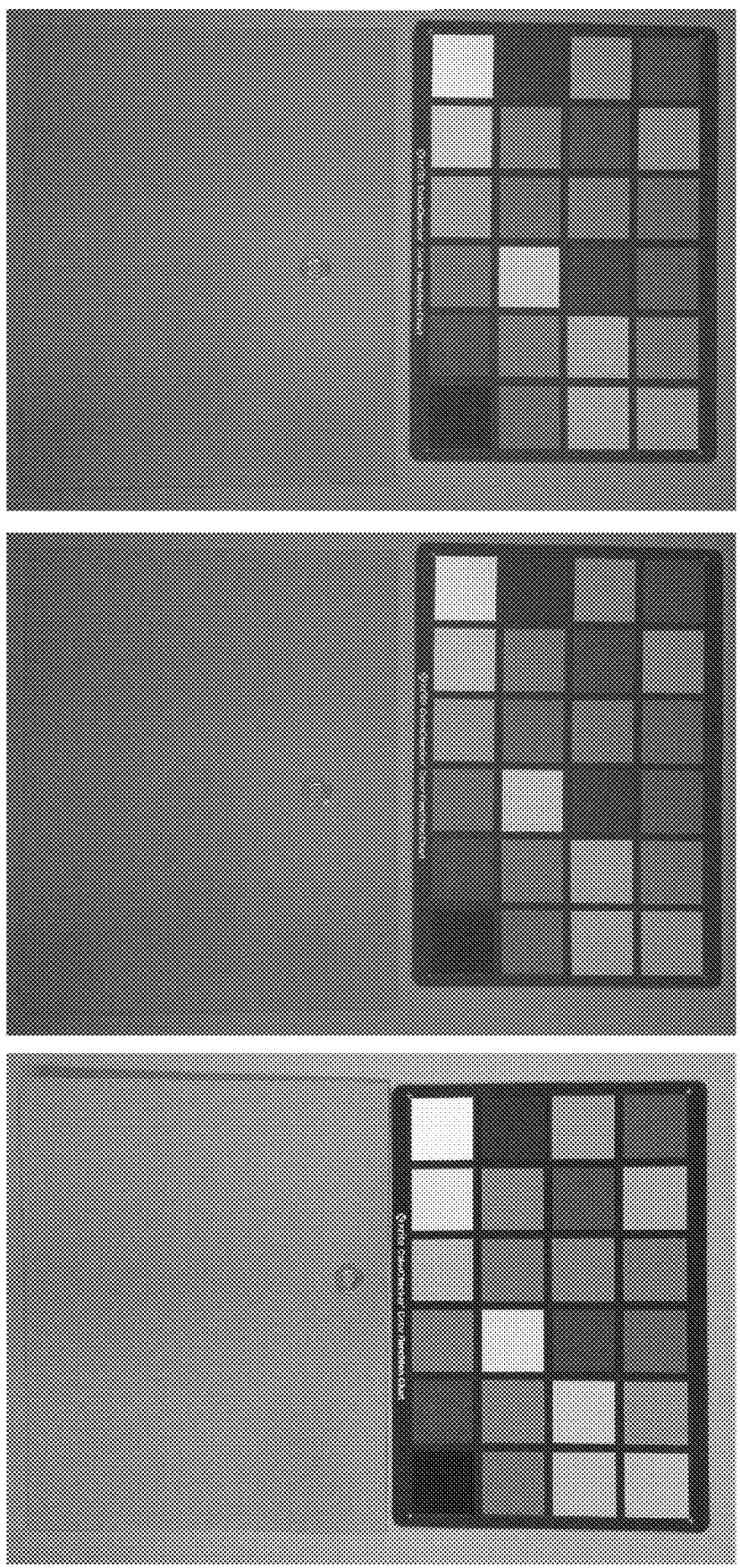
FIG. 15 shows exemplary images for comparison of a previous automatic white balancing method by a computing device (left), and automatic white balancing by a computing device using the present disclosure (right) for a scene under tungsten light.

In another example, FIG. 15 shows a comparison of automatic white balancing by a computing device using previous methods (left), and automatic white balancing used by a computing device using the present disclosure (right) for a scene under tungsten light. The image in the middle is manually white balanced using a gray patch (e.g. the 21st patch of the color checker). Due to un-corrected color shading, the manually white-balanced image looks a little blue. The grays in the image by the computing device have turned quite orange, while the image by the computing device using the present disclosure looks accurate.

Aspects of the present disclosure define the gray region more accurately and thus enable a tight gray region thereby allowing more accurate automatic white balancing.

Alternatively or in addition to the other examples described herein, examples include any combination of the following:

wherein the sensor configuration component 110 white balances the accessed data by applying white balancing gains for a white point to the pair of red/green and blue/green ratios before the color distance is calculated.

wherein the camera component 112 further averages red/green and blue/green ratios of the gray points to calculate AWB gains for white balancing the image data 108.

wherein each of the gray points is associated with a constraint value, wherein each of the gray points having the constraint value lying outside a predefined range is excluded from calculating the AWB gains.

wherein the camera component 112 identifies a point as a gray point if the color distance for the point is less than the threshold value.

wherein the sensor configuration component 110 modifies the color distance to bias the threshold value towards one of the red/green and blue/green ratios corresponding to the point.

wherein the camera component 112 further identifies gray points that are at equal distance to a corresponding white point, wherein the identified gray points form an ellipse.

wherein the camera component 112 represents each point associated with the image data 108 by a combination of red/green and blue/green ratios.

wherein calculating the color distance metric comprises calculating the color distance metric based on red/green and blue/green ratios, or red-green values and blue-green values of points in the accessed image data 108.

for the defined gray region, determining whether each point associated with a captured image is within the defined gray region and identifying gray points as input to an AWB algorithm.

representing the gray region with two sets of line segments defining upper and lower boundaries of the gray region.

wherein defining the gray region comprises using curve fitting for the upper and lower boundaries using at least two polynomials and a range of red/green values for each point in any possible gray region.

determine whether a point belongs to the gray region using an upper and a lower boundary of the gray region, wherein the upper and the lower boundary are represented using a set of line segments.

associate each of the identified gray points with a constraint value, wherein each of the identified gray points having the constraint value lying outside a predefined range are defined as a dark point or a light gray point.

identify the gray points by calculating a pair of blue/green values based on a lower boundary and an upper boundary defining the gray region, and determine whether the blue/green value of each point falls between the pair of the blue/green values.

At least a portion of the functionality of the various elements shown in the figures may be performed by other elements in the figures, or an entity (e.g., processor, web service, server, application program, computing device, etc.) not shown in the figures.

In some examples, the operations illustrated in FIG. 3, FIG. 10 and FIG. 11 may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like. Such systems or devices may accept input from the user in any way, including from input devices such as a keyboard or pointing device, via gesture input, touch input, and/or via voice input.

Examples of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

Aspects of the disclosure transform a general-purpose computer into a special-purpose computing device (e.g., computing device 102) when configured to execute the instructions described herein.

The examples illustrated and described herein as well as examples not specifically described herein but within the scope of aspects of the disclosure constitute exemplary means for accurately identifying gray pixels as input to AWB algorithms. For example, the elements illustrated in FIG. 2, such as when encoded to perform the operations illustrated in FIG. 3, FIG. 10, and/or FIG. 11 constitute exemplary means for accessing data including a pair of red/green and blue/green ratios corresponding to a point in any possible gray region, exemplary means for white-balancing the red/green and blue/green ratios, exemplary means for calculating a plurality of color distances using the white-balanced data to a white point corresponding to one of a plurality of different light sources, exemplary means for defining a gray region based on the calculated color distances, exemplary means for determining, for the defined gray region, whether each point associated with a captured image is within the defined gray region, and exemplary means for identifying, based on the determination, gray points as input to an AWB algorithm.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that the matter contained in the above description and shown in the accompanying drawings shall be interpreted as illustrative and not in a limiting sense.

What is claimed is:

1. A system, comprising:
   a sensor configuration component that when executed causes at least one processor to define a gray region in an image captured by an image sensor through:
     accessing red, green, or blue values corresponding to a pixel in the image, calculating a luma of the pixel using at least two of the red, blue, or green values corresponding to the pixel, determining that the luma corresponding to the pixel is outside of a predefined range for luma, incident to said determination that the luma corresponding to the pixel is outside of the predefined range of luma, discarding the pixel from being used in auto-white balancing a portion of the image, and determining remaining other pixels in the image are within the gray region from remaining pixels that are auto-white balanced.

2. The system of claim 1, wherein the processor is further configured for interpolating the at least one of the white points to form a curve associated with the image data.

3. The system of claim 1, wherein the sensor configuration component is further configured to cause the at least one processor to:

auto-white balance a portion of the image data, calculate a color distance for the point after said white balancing is performed, wherein the color distance comprises a distance of the white-balanced data associated with the point to a white point in the image data.

4. The system of claim 1, wherein said identification of the gray region is performed by curve fitting a line segment to the image data and determining a distance of one or more gray points to the line segment.

5. The system of claim 1, wherein the sensor configuration component causes the at least one processor to:

curve fit a first portion with a polynomial to determine an upper boundary in the image data, and use the curve-fitted first portion in the identification of the gray region in the image data.

6. The system of claim 5, wherein the sensor configuration component causes the at least one processor to:

curve fit a second portion with a second polynomial to determine a lower boundary in the image data, and use the curve-fitted second portion in the identification of the gray region in the image data.

7. The system of claim 1, wherein said determining that the luma corresponding to the pixel is outside of the predefined range for luma comprises:

calculating luma for pixels of the image data using ratios of the red, green, or blue values of said pixels.

8. The system of claim 7, wherein said calculation is performed according to the following:

$$\text{luma}=0.21*R+0.72*G+0.07*B,$$

wherein (R), (G), and (B) represent red, green, and blue pixel values, respectively.

9. A method for defining a gray region in an image, the method comprising:

accessing red, green, or blue values corresponding to a pixel in the image, calculating a luma of the pixel using at least two of the red, blue, or green values corresponding to the pixel, determining that the luma corresponding to the pixel is outside of a predefined range for luma, incident to said determination that the luma corresponding to the pixel is outside of the predefined range of luma, discarding the pixel from being used in auto-white balancing a portion of the image, and determining a portion of the other pixels in the image are within the gray region.

10. The method of claim 9, further comprising:

curve fitting a first portion with a polynomial to determine an upper boundary in the image data, and using the curve-fitted first portion in the identification of the gray region in the image data.

11. The method of claim 10, further comprising:

curve fitting a second portion with a second polynomial to determine a lower boundary in the image data, and using the curve-fitted second portion in the identification of the gray region in the image data.

12. The method of claim 9, wherein said determining that the luma corresponding to the pixel is outside of the predefined range for luma comprises:

calculating luma for pixels of the image data using ratios of the red, green, or blue values of said pixels.

13. The method of claim 9, wherein said calculation of the luma is performed according to the following:

$$\text{luma}=0.21*R+0.72*G+0.07*B,$$

wherein (R), (G), and (B) represent red, green, and blue pixel values, respectively.

14. The method of claim 9, wherein said determination that the portion of the other pixels are within the gray region comprises:

auto-white balancing the other pixels remaining after the pixel is discarded for being outside of the predefined range of luma; and determining the portion of the other pixels pass a gray pixel condition and a luma condition, the luma condition being met by the other pixels being within the predefined range for luma.

15. The method of claim 14, further comprising, for the portion of pixels passing the gray pixel condition and the luma condition, performing the following:

obtaining red/green and blue/green ratios for pixels in the portion of pixels;

calculating average ratio for the red/green and blue/green ratios;

calculating white-balance gains based on the averaged red/green and blue/green ratios; and white-balancing the portion of the pixels based on the calculated white-balance gains.

16. The method of claim 15, wherein the calculated white-balance gains are computed by figuring the inverse of averages of the red/green ratio and the blue/green ratio.

17. One or more computer-storage media in the form of machine-readable memory embodied with executable instructions for identifying gray regions in image data, comprising:

accessing red, green, or blue values corresponding to a pixel in the image, calculating a luma of the pixel using at least two of the red, blue, or green values corresponding to the pixel, determining that the luma corresponding to the pixel is outside of a predefined range for luma, incident to said determination that the luma corresponding to the pixel is outside of the predefined range of luma, discarding the pixel from being used in auto-white balancing a portion of the image, and determining remaining other pixels in the image are within the gray region from remaining pixels that are auto-white balanced.

18. The media of claim 17, wherein said determining that the luma corresponding to the pixel is outside of the predefined range for luma comprises:

calculating luma for pixels of the image data using ratios of the red, green, or blue values of said pixels.

19. The media of claim 18, wherein said calculation of the luma is performed according to the following:

$$\text{luma}=0.21*R+0.72*G+0.07*B,$$

wherein (R), (G), and (B) represent red, green, and blue pixel values, respectively.

20. The media of claim 17, further comprising white balancing the other pixels points of the image data through applying one or more white-balancing gains to red/green or blue/green ratios of the red and blue values to produce associated white-balance data.

* * * * *